(12) United States Patent
Kumar et al.

(10) Patent No.: US 8,068,870 B2
(45) Date of Patent: Nov. 29, 2011

(54) ENTERPRISE LOCATION DISCOVERY IN DUAL-MODE PHONES

(75) Inventors: Chetan R. Kumar, Karnataka (IN); Pradeep J. Iyer, Cupertino, CA (US); Arun Mahajan, Palo Alto, CA (US)

(73) Assignee: Aruba Networks, Inc., Sunnyvale, CA (US)

( * ) Notice: Subject to any disclaimer, the term of this patent is extended or adjusted under 35 U.S.C. 154(b) by 693 days.

(21) Appl. No.: 12/102,650

(22) Filed: Apr. 14, 2008

(65) Prior Publication Data
US 2009/0258668 A1  Oct. 15, 2009

(51) Int. Cl.
*H04M 1/00* (2006.01)
(52) U.S. Cl. ............ 455/552.1; 455/550.1; 455/556.1
(58) Field of Classification Search .......... 455/411, 455/414.1, 415, 426.1, 426.2, 432.1, 550.1, 455/552.1, 556.1
See application file for complete search history.

(56) References Cited

U.S. PATENT DOCUMENTS

| | | | | |
|---|---|---|---|---|
| 6,445,921 | B1 * | 9/2002 | Bell | 455/426.1 |
| 7,463,887 | B2 * | 12/2008 | Roberts et al. | 455/435.2 |
| 2009/0068970 | A1 * | 3/2009 | Ahmed et al. | 455/161.1 |
| 2009/0227253 | A1 * | 9/2009 | Hwang | 455/432.2 |

\* cited by examiner

*Primary Examiner* — Tuan H Nguyen
(74) *Attorney, Agent, or Firm* — Blakely, Sokoloff, Taylor & Zafman LLP

(57) ABSTRACT

Enterprise location discovery in dual-mode phones. As dual-mode phones move within the enterprise Wi-Fi network, they track which cell tower they are associated with, reporting this information to an enterprise mobility controller. The enterprise mobility controller builds a list of cell tower identifiers which are associated with enterprise Wi-Fi coverage, and makes this list available to subscribing dual-mode phones. Subscribing dual-mode phones can use this list to only scan for Wi-Fi availability when they are associated with a cell tower which is on the list.

9 Claims, 1 Drawing Sheet

network interfaces to connect to access nodes 120 and other digital networks. It is also understood by those in the art that while mobility controller 110 is shown as a separate device, it may be implemented as a process or a set of processes running on another digital system attached to network 130, such as a network controller.

ENTERPRISE LOCATION DISCOVERY IN DUAL-MODE PHONES

BACKGROUND OF THE INVENTION

The present invention relates to the operation of dual-mode phones, and more particularly, to location discovery in dual-mode phones.

As known to the art dual-mode phones can make and receive calls either through a local Wi-Fi network, or through a cellular network. In an enterprise environment, the enterprise PBX connects to the enterprise Wi-Fi network. In such an environment, dual-mode phones can provide seamless connectivity. When an outside party calls into the enterprise, a mobility controller connected to the PBX forwards the call to the Wi-Fi side of the dual mode phone if it is range, or to the cellular side if the phone if it is not within Wi-Fi range. When the dual-mode phone is out of enterprise Wi-Fi range, outside party calls placed to the enterprise number are re-routed through the cellular network to the dual-mode phone. Such systems provide single-number connectivity to users over wide areas where connectivity is available.

For the enterprise, cost savings are maximized by routing calls through the enterprise Wi-Fi network. The dual-mode phone should turn on Wi-Fi service and register with the enterprise PBX to receive calls via Wi-Fi when in the range of Enterprise Wi-Fi services, whether at the enterprise, or through remote access nodes extending enterprise Wi-Fi service. Unfortunately, for most dual-mode phones, scanning for WI-Fi coverage, particularly when outside of Wi-Fi coverage, represents a significant drain on battery life.

What is needed is a way to better control Wi-Fi scanning in dual-mode phones.

BRIEF DESCRIPTION OF THE DRAWINGS

The invention may be best understood by referring to the following description and accompanying drawings that are used to illustrate embodiments of the invention in which.

DETAILED DESCRIPTION

Figure 1:
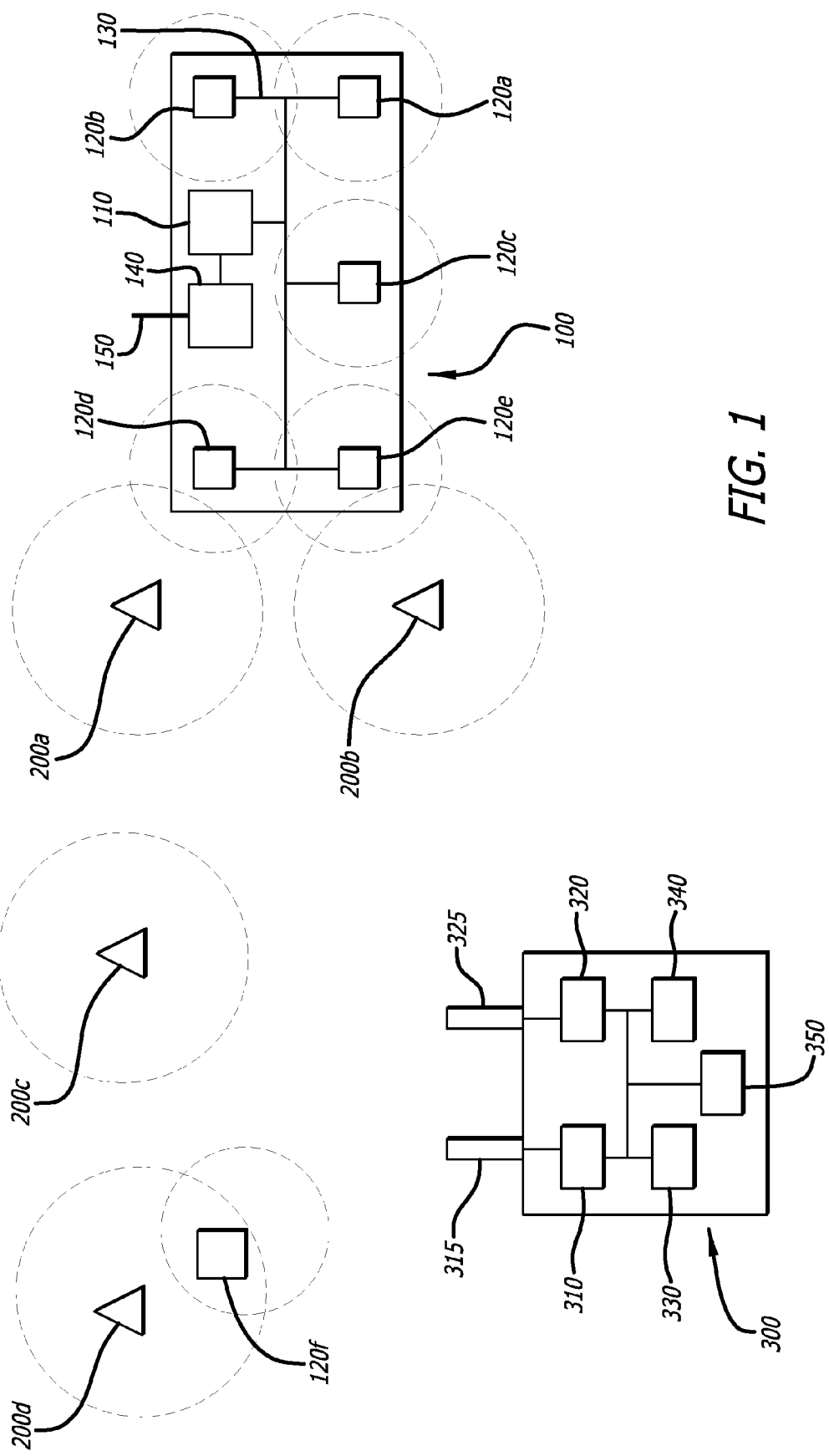
FIG. 1 shows a dual-mode phone operating in a network.

Embodiments of the invention relate to enterprise location discovery in dual-mode phones. Dual-mode phones are used to track cell tower information, such as carrier name, location area code, and cell identity. This information is tracked by a mobility server, and coupled to Wi-Fi coverage information, building an association of cell sites which also have enterprise Wi-Fi coverage. This information is also made available to dual-mode client devices. When a dual-mode device is out of enterprise Wi-Fi coverage, the Wi-Fi radio in the device is operated in a low-power mode. As the dual-mode device operates on the cellular service, it tracks cell tower information, and whenever the current cell tower information denotes availability of Wi-Fi coverage, the device reactivates the Wi-Fi radio to more aggressively scan for enterprise Wi-Fi coverage.

FIG. 1 shows an environment suitable for practicing the invention. Enterprise 100 has a mobility controller (MC) 110 connected to enterprise network 130, which provides continuity services to access nodes 120*a*, 120*b*, 120*c*, 120*d*, and 120*e*. Remote access node 120*f* also connects to enterprise network 130 and mobility controller 110 through a public digital network, not shown. Mobility controller 110 also connects to PBX 140, which provides access to telephone network 150. As is understood by the art, mobility controller 110 is a programmed digital computer, having a central processing unit (CPU) controlling the device, a memory hierarchy comprising a mix of volatile and non-volatile memory devices for storing programs and data, and interfaces such as network interfaces to connect to access nodes 120 and other digital networks. It is also understood by those in the art that while mobility controller 110 is shown as a separate device, it may be implemented as a process or a set of processes running on another digital system attached to network 130, such as a network controller.

Each access node 120 provides wireless access to client devices over a certain area, shown in the FIGURE. It is common for such access nodes 120 to operate according to one or more of the IEEE 802.11 standards, for example providing wireless services according to 802.11 a, b, g, and n standards and proposed standards, commonly called Wi-Fi. As is known to the art, each access node typically contains a first network interface, for example to connect to network 130 and mobility controller 110, a central processing unit (CPU) controlling the device, a memory hierarchy comprising a mix of volatile and non-volatile memory devices for storing programs and data, and one or more wireless interfaces, for example wireless interfaces operating to IEEE 802.11b/g and 802.11a standards.

Enterprise 100 operates in an area covered by different cellular phone services, provided through cell towers 200*a*, 200*b*, 200*c*, 200*d*. Each such cell tower has identifying information associated with it, such as the carrier name, Location Area Code (LAC) and Call Identity (CI). Different cell towers may represent different cell carriers, such as Verizon, AT&T, and the like.

Dual-mode phone 300 is a portable digital device having a first radio interface 310 and antenna 315 for communicating with one or more cellular services 200, a second radio interface 320 and antenna 325 for connecting with a digital network such an 802.11b/g Wi-Fi network, a central processing unit (CPU) 330 controlling the device, connected to memory hierarchy 340 comprising a mix of volatile and non-volatile memory devices for storing programs and data, and interface elements 350 which include items such as keyboards, displays, speakers, microphones, and the like.

In operation, when dual-mode phone 300 is operating within the Wi-Fi coverage of enterprise 100, dual-mode phone 300 connects through one of access nodes 120, for example through its Wi-Fi interface 320. In this manner, incoming calls arriving through telephone network 150 can be routed by PBX 140 through mobility controller 110 or other suitable bridge to digital network 130 and the proper access node 120 to dual-mode phone 300. As dual-mode phone 300 moves within the enterprise network, its connection may be handed off between different access nodes 120.

As is known in the art, the cellular side of dual-mode phone 300, radio interface 310, maintains an association with a cell tower. This association changes as dual-mode phone moves.

According to an aspect of the current invention, dual-mode phone 300 reports currently associated cell tower information to mobility controller 110, such as when dual-mode phone 300 registers with the enterprise Wi-Fi network. As dual-mode phone 300 moves within the enterprise Wi-Fi network, when the associated cell tower information changes, dual-mode phone 300 reports this information to mobility controller 110.

As dual-mode phones 300 move within enterprise 100, mobility controller 110 collects this information and develops a list associating cell tower information with enterprise Wi-Fi availability. This list is stored in mobility controller 110's memory, and made available to dual-mode phones 300, to be stored in memory 340.

As an example, cell towers 200a and 200b are associated with Wi-Fi access. Cell tower 200c is not associated with enterprise Wi-Fi access. Remote access node 120f, for example at an enterprise user's residence, is in the coverage area of cell tower 200d, so cell tower 200d would be associated with enterprise Wi-Fi access.

According to an aspect of the invention, as dual-mode phone 300 moves outside of enterprise 100 Wi-Fi coverage, it shuts down Wi-Fi radio 320, or switches Wi-Fi radio 320 to a very low power state, for example only scanning for Wi-Fi access every few seconds. As dual-mode phone 300 moves and changes cell tower association, the new cell tower information is queried in the list provided by mobility controller 110. If the newly associated cell tower information is associated with enterprise Wi-Fi access, Wi-Fi radio 320 is switched to a more aggressive scanning state, scanning for Wi-Fi access nodes.

As an example, when dual-mode phone 300 comes within range of cell tower 200c, the identification information associated with cell tower 200c is not in the list. But when dual-mode phone 300 associates with cell tower 200d, this cell tower is on the list, and Wi-Fi radio 320 is switched to a more aggressive scanning state.

In another aspect of the invention, when a dual-mode phone 300 is connected to the enterprise Wi-Fi service, and is on a call, mobility controller 110 tracks the dual-mode phone so that it may aggressively initiate a call handover to the cellular service as dual-mode phone 300 moves out of enterprise Wi-Fi coverage. As an example, if dual-mode phone 300 is with the coverage of access node 120d and making a call, as it moves outside of Wi-Fi coverage, mobility controller 110 through PBX 140 will hand the call off to the cellular service.

In operation, there are many ways in which the list kept by mobility controller 110 may be made available to dual-mode phones 300. The entire list may be pushed to a dual-mode phone 300 when it registers with mobility controller 110. Alternatively, mobility controller 110 may track the time when each supported dual-mode phone 300 has had its list updated, and only send out changes since the last update. Dual-mode phone 300 may pull the list from controller 110. Mobility controller 110 may store information on which carrier a particular dual-mode phone 300 is associated with, and only send information representing that carrier. Or, dual-mode phone 300 may filter the list from mobility controller 110 and only store those entries associated with carriers that particular dual-mode phone may use.

It may be desirable for mobility controller 110 to time-stamp and age information on the list, so that changes to enterprise Wi-Fi configurations, as well as changes in the cellular network, will automatically be updated. By time-stamping when various cell towers are "seen" by dual-mode phones, cell towers which have not been "seen" for a predetermined amount of a time, such as a week, may be dropped from the list.

It may also be desirable for dual-mode phone 300 to similarly time-stamp and age the list carried in the dual-mode phone. For example, dual-mode phone 300 may update a time stamp associated with a cell tower periodically when that cell tower is seen. After a predetermined period of time when the cell tower has not been seen, it may be dropped from the list. When a dual-mode phone user based in Sunnyvale, Calif. visits an enterprise location in Santa Rosa, Calif., the local mobility controller will provide the dual-mode phone a list of cell tower information associated with Wi-Fi availability at the Santa Rosa site. Upon returning to Sunnyvale, the Santa Rosa entries will gradually time out and be pruned from the list kept by the dual-mode phone.

While the invention has been described in terms of various embodiments, the invention should not be limited to only those embodiments described, but can be practiced with modification and alteration within the spirit and scope of the appended claims. The description is this to be regarded as illustrative rather than limiting.

We claim:

1. A method of operating a network of a plurality of dual-mode phones each having a first radio for communicating with a cellular network comprising a plurality of cell towers and a second radio for communicating with a mobility controller associated with an enterprise wireless network via at least one of a plurality of access nodes, the method comprising:

collecting cell tower identification information by a dual-mode phone when the dual-mode phone is connected to both the cellular network and the enterprise wireless network;

transferring the cell tower identification information by the dual-mode phone to the mobility controller that collects cell tower identification from the plurality of dual-mode phones to form a list of cell towers having an access node within a coverage area;

increasing scanning for access nodes by the dual-mode phone if the dual-mode phone is in communications with a cell tower on the list of cell towers;

moving the second radio to a lower power state by the dual-mode phone when the dual-mode phone is out of range of the enterprise wireless network; and moving the second radio to a higher power state by the dual-mode phone when the first radio of the dual-mode phone is connected to a cell tower on the list of cell towers associated with enterprise wireless availability.

2. The method of claim 1 further comprising:
providing the list of cell lowers to the plurality of dual-mode phones.

3. The method of claim 2 where the providing of the list of cell towers to the plurality of dual-mode phones further comprises pushing the list of cell towers from the mobility controller.

4. The method of claim 2 where the providing of the list of cell towers to the plurality of dual-mode phones further comprises requesting the list of cell towers from the mobility controller by the dual-mode phone.

5. The method of claim 1 further comprising maintaining a scanning rate for wireless access nodes by the dual-mode phone if the dual-mode phone is in communications with a cell tower that is not listed on the list of cell towers.

6. The method of claim 1 further comprising initiating a call handover to the cellular network as the dual-mode phone moves outside a coverage area of the enterprise wireless network.

7. The method of claim 1, wherein the enterprise wireless network is an enterprise Wi-Fi network.

8. The method of claim 1 where the second radio is powered off when out of range of the enterprise wireless network.

9. The method of claim 1 where the second radio is powered on when the first radio of the dual-mode phone is connected to a cell tower on the list of cell towers associated with enterprise wireless availability.

* * * * *